UNITED STATES PATENT OFFICE.

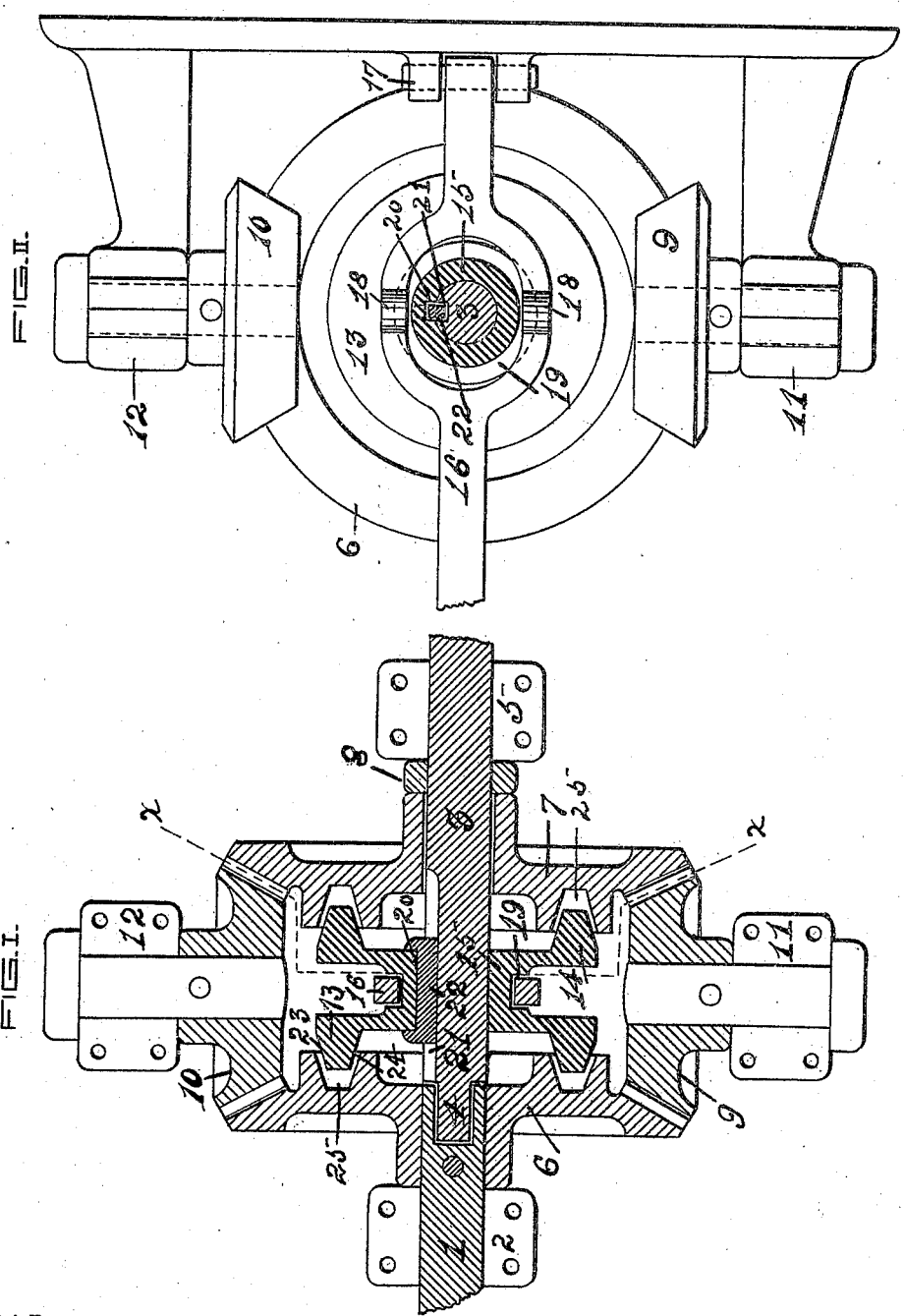

WALTER K. THOMAS, OF MADISONVILLE, OHIO.

REVERSIBLE-MOTION MECHANISM.

SPECIFICATION forming part of Letters Patent No. 688,899, dated December 17, 1901.

Application filed March 7, 1901. Serial No. 50,214. (No model.)

*To all whom it may concern:*

Be it known that I, WALTER K. THOMAS, a citizen of the United States, residing at Madisonville, in the county of Hamilton and State of Ohio, have invented certain new and useful Improvements in Reversible-Motion Mechanism, of which the following is a specification.

This invention relates to improvements in reversible-motion mechanism; and it consists of one section of a shaft having a revolving motion in one direction and of another section contiguous thereto that can be driven therefrom in the same direction or in an opposite direction, as may be desired, without reducing the speed of the driving-shaft to change the direction of motion of the driven shaft.

The invention is illustrated in the accompanying drawings, in which—

Figure 1 is a sectional view of the device, and Fig. 2 is a sectional view of Fig. 1 on the line X X.

Like numerals refer to the same parts in each view.

The numeral 1 designates the driving or initial shaft, resting in the bearing 2, secured to and driven by any suitable engine or power device. The driven or secondary shaft 3 has a bearing within the driving-shaft at 4 and another at 5. Thus the sections 1 and 3 form practically one shaft as to alinement and bearings. To the shaft 1 is permanently attached the gear-wheel 6, so that at all times it will revolve in unison therewith. The gear-wheel 7 is placed on the shaft 3, but not permanently attached to the shaft 3, which latter is provided with a collar 8 to keep the wheel 7 in its place relevant to the other mechanism. On each side of the shaft and meshing into the wheels 6 and 7 are two miter or bevel wheels 9 and 10, supported by and arranged to turn freely in suitable bearings 11 and 12, and by means of which motion is conveyed from the wheel 6 to the wheel 7. Interposed between the wheels 6 and 7 is arranged a doubly-acting clutch mechanism, consisting of the disks 13 and 14, secured together by the hub 15, and provided with double-surface contact ribs or projections 23 and 24, arranged to fit within grooves 25 in the faces of wheels 6 and 7, having coinciding surfaces to those 23 and 24 on the clutch-disks 13 and 14, whereby a double frictional contact is made between the disks and wheels, and thereby securing a powerful friction-clutch between them when engagement is established. To the hub 15 is attached the shifting or reversing lever 16, which is pivoted to the frame at 17 and provided with curved projections 18, by which the lever 16 acts on the hub 15 to shift the same and permit the lever 16 to move in the groove 19 laterally, as the groove 19 is of sufficient width to permit of the same, thereby always establishing a close connection between the hub 15 and lever 16 by means of the said curved projections 18.

The shaft 3 and hub 15 are provided with feather-ways 20 and 21, in which is placed the feather 22 in the usual manner and by which the hub 15 and clutch-disks 13 and 14 are permitted to be moved parallel with the shaft 3, but prevented from turning thereon, whereby the same motion is communicated from the wheel 6 directly to the shaft 3 when the clutch-disk 13 is engaged with the wheel 6 or indirectly and in an opposite direction to that of the wheel 6 when the clutch-disk 14 is engaged with the wheel 7.

In the operation if it is desired to operate the driven shaft 3 in the same direction as that of the driving-shaft 1 the shifting-lever 16 is operated so as to engage the clutch-disk 13 with the wheel 6, thereby directly connecting the two shafts 1 and 3; but if it is desired to operate the driven shaft 3 in the opposite direction to the driving-shaft 1 the shifting-lever 16 is operated so as to engage the clutch-disk 14 with the wheel 7, in which event motion is communicated from the driving-shaft 1 and wheel 6 through wheels 9 and 10, which act as idlers, to the wheel 7, and its being secured to shaft 3 by means of the clutch-disk 14 causes the shaft 3 to revolve in the opposite direction to the shaft 1.

By this invention the motion of section 3 of the shaft can be reversed while the section 1 is revolving at full speed, as the frictional contact between the wheels 6 and 7 and the clutch-disks 13 and 14 will slip sufficiently at first to prevent any damaging effect being imparted to the mechanism, and the double friction-contact insures a permanent grip between the wheels and clutch-disks, By the use of two intermediate wheels 9 and 10 the power transmitted is distributed, so as to diminish at one point the sudden strain on the gearing when suddenly reversing the motion and also counteract the transverse thrust against the shaft, due to the tendency of the gear-wheels to separate.

Having thus described the invention, what I claim as new, and desire to secure by Letters Patent, is—

A reversible-motion mechanism comprising a shaft formed in sections, one entering the other, a gear-wheel keyed directly to one of the sections of said shaft and having a concentric groove formed in its inner face, a gear-wheel loosely mounted on the other section of said shaft and also having a concentric groove in its inner face, oppositely-placed idle gears meshing with both of said former gears, and a clutch comprising a hub mounted to slide on one of the sections of said shaft and having double flanges extending therefrom, said flanges having their outer faces provided with concentric ribs or projections arranged to enter the concentric grooves of said gear-wheels, substantially as set forth.

In testimony whereof I affix my signature in the presence of two witnesses.

WALTER K. THOMAS.

Witnesses:
JOHN J. CARROLL,
CLARENCE E. BLADES.